(12) United States Patent
Pestl et al.

(10) Patent No.: US 11,084,654 B2
(45) Date of Patent: Aug. 10, 2021

(54) TOUCHLESS RECEPTACLE WITH ACTIVE FRAGRANCING

(71) Applicant: Forever Gifts, Inc., Arlington, TX (US)

(72) Inventors: Marcus Pestl, Dallas, TX (US); Hendra Wijaya, Arlington, TX (US)

(73) Assignee: Forever Gifts, Inc., Arlington, TX (US)

(*) Notice: Subject to any disclaimer, the term of this patent is extended or adjusted under 35 U.S.C. 154(b) by 1 day.

(21) Appl. No.: 16/237,852

(22) Filed: Jan. 2, 2019

(65) Prior Publication Data

US 2020/0207544 A1 Jul. 2, 2020

(51) Int. Cl.

| | |
|---|---|
| *B65F 1/16* | (2006.01) |
| *B65F 1/06* | (2006.01) |
| *B65F 7/00* | (2006.01) |
| *G05D 7/06* | (2006.01) |
| *B05B 1/14* | (2006.01) |
| *E05F 15/73* | (2015.01) |
| *E05F 15/60* | (2015.01) |

(52) U.S. Cl.
CPC .............. *B65F 1/1638* (2013.01); *B05B 1/14* (2013.01); *B65F 1/06* (2013.01); *B65F 7/00* (2013.01); *E05F 15/60* (2015.01); *E05F 15/73* (2015.01); *G05D 7/0617* (2013.01); *B65F 2210/129* (2013.01); *B65F 2210/168* (2013.01); *E05Y 2900/602* (2013.01)

(58) Field of Classification Search
CPC ... B05B 15/00; B05B 1/14; B65F 1/06; B65F 1/1638; B65F 7/00; B65F 7/005; B65F 2210/129; B65F 2210/168; E05F 15/60; E05F 15/73

USPC .......... 239/34–60, 274, 289; 220/87.1, 87, 2
See application file for complete search history.

(56) References Cited

U.S. PATENT DOCUMENTS

| | | | | |
|---|---|---|---|---|
| 2,434,238 | A * | 1/1948 | Wolfson | B65F 7/00 220/87.2 |
| 2,652,173 | A * | 9/1953 | Farrell | B65F 7/00 220/87.2 |
| 4,902,482 | A * | 2/1990 | Faust | A61L 2/10 422/121 |
| 7,516,865 | B1 * | 4/2009 | Pierre | B65F 7/00 220/87.1 |
| 7,878,359 | B1 * | 2/2011 | Ko | B65F 7/00 220/87.2 |
| 8,647,587 | B2 * | 2/2014 | Dunn | B65F 1/062 220/522 |
| 9,033,176 | B2 | 5/2015 | Liistro et al. | |
| 2002/0108507 | A1 | 8/2002 | May et al. | |
| 2007/0039965 | A1 | 2/2007 | Todd | |
| 2009/0200393 | A1 * | 8/2009 | Avelar | C11C 5/006 239/60 |
| 2010/0294766 | A1 * | 11/2010 | Wang | B65F 1/1607 220/211 |

(Continued)

*Primary Examiner* — Alex M Valvis
(74) *Attorney, Agent, or Firm* — Klemchuk LLP

(57) ABSTRACT

A receptacle may provide a touchless opening and closing lid that may be activated by a motion sensor. A swing-door may form a front of the receptacle and may open and close to expose and provide access to a molded interior liner. A non-slip molded base may form a platform for the receptacle. A fragrancing system may be provided inside of the lid and may emit a waterless mist containing a fragrance when the lid opens.

10 Claims, 6 Drawing Sheets

(56) References Cited

U.S. PATENT DOCUMENTS

| | | | |
|---|---|---|---|
| 2012/0234849 A1* | 9/2012 | Hughes | B65F 7/00 220/810 |
| 2013/0180872 A1* | 7/2013 | Sader | B65F 7/00 206/216 |
| 2015/0259140 A1* | 9/2015 | Yang | B65F 1/1646 220/211 |

* cited by examiner

TOUCHLESS RECEPTACLE WITH ACTIVE FRAGRANCING

TECHNICAL FIELD

The present disclosure relates, in general, to a waste receptacle, and more specifically, to a touchless waste receptacle with waterless odor technology.

BACKGROUND

Typically, waste receptacles can require users to manually open and close the receptacles. Waste can compile or possess an unpleasant odor that may prompt users to spray air freshener or another deodorizer to combat malodorous scents. By spraying air fresheners and other deodorizers, a residue may be left on surfaces. Floors and finishes can become damaged and can present slipping hazards from exposure to residue.

SUMMARY

Embodiments of the present disclosure may provide a receptacle system that may include a receptacle, a front-opening door, a lid, and a fragrancing system. The receptacle may provide a receiving area that may define a molded interior liner. The front-opening door may define a front side of receptacle, and the front-opening door may be operable to open and close the front side of the receptacle. The lid may have a top portion and a rim, and the top portion may be provided to open and close the lid. The rim may be shaped to securely rest along a top perimeter of the receptacle. The fragrancing system may be arranged in a pocket of the rim and may emit a waterless mist from a nozzle. A non-slip molded base may be configured to provide a platform for the receptacle. An exterior may be made of stainless steel and may be operable to resist bacteria. A battery-operated system may be provided in the lid and may include a motor. The motor may be powered by one or more rechargeable batteries to open and close the top portion of the lid. The fragrancing system may include an electronic control board that may be connected to one or more rechargeable batteries. The top portion of the lid may be operable to automatically open when a motion sensor is activated. The motion sensor may be embedded in the rim. The fragrancing system may include a tube that may be arranged to connect a compressor to an atomizing pump module.

Other embodiments of the present disclosure may provide a touchless receptacle system that may include a receptacle, a front-opening door, and a lid. The receptacle may have a receiving area that may define a molded interior liner. The front-opening door may define a front side of receptacle and may be operable to open and close the front side of the receptacle. The lid may have a top portion and a rim, and the top portion may be provided to open and close the lid. The rim may be shaped to securely rest along a top perimeter of the receptacle. A non-slip molded base configured to provide a platform for the receptacle. The top portion of the lid may be operable to automatically open when a motion sensor is activated, and the motion sensor may be embedded in the rim. A fragrancing system may be provided in a pocket of the rim and may be operable to emit a waterless mist from a nozzle. An electronic control board may be provided inside of the fragrancing system and may be connected to one or more rechargeable batteries. A motor may be connected to the electronic control board and may be arranged above a compressor operable to generate bursts of compressed air. A tube may connect the compressor to an atomizing pump module. The atomizing pump module may be operable to receive contents of a container that may be arranged underneath the atomizing pump module and may emit the contents through the nozzle in the form of an ultrafine mist.

Further embodiments of the present disclosure may provide a method of operating a receptacle. The method may include the step of activating a motion sensor and automatically opening a top portion of a lid. The method may also include the step of spraying a mist from a nozzle when the top portion of the lid is opening. The method may provide the step of adjusting an intensity of the mist when an intensity dial is turned by a user, and the intensity may be a measure of the concentration of a scent or fragrance in the mist. The method may include the step of electronically powering the opening and closing of the top portion of the lid with one or more rechargeable batteries. The method may include the step of generating bursts of compressed air and delivering the compressed air to an atomizing pump module. The method may further include the step of receiving contents from a container in the atomizing pump module. The method may provide the step of atomizing the contents from the container and dispensing an ultrafine mist through a nozzle connected to the atomizing pump module. The method may also provide the step of preventing residue from accumulating on a surface exposed to the mist, wherein the mist is waterless. The method may provide the step of opening a swing-door from a front-facing side of the receptacle; wherein one or more hooks are removed from one or more corresponding apertures.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Embodiments of the present disclosure may generally provide a touchless receptacle that may provide a front-opening swing door and/or a waterless mist containing a fragrance may automatically spray when a lid of the touchless receptacle opens. The touchless receptacle may automatically open and close when a motion sensor is activated in embodiments of the present disclosure.

Figure 1A:
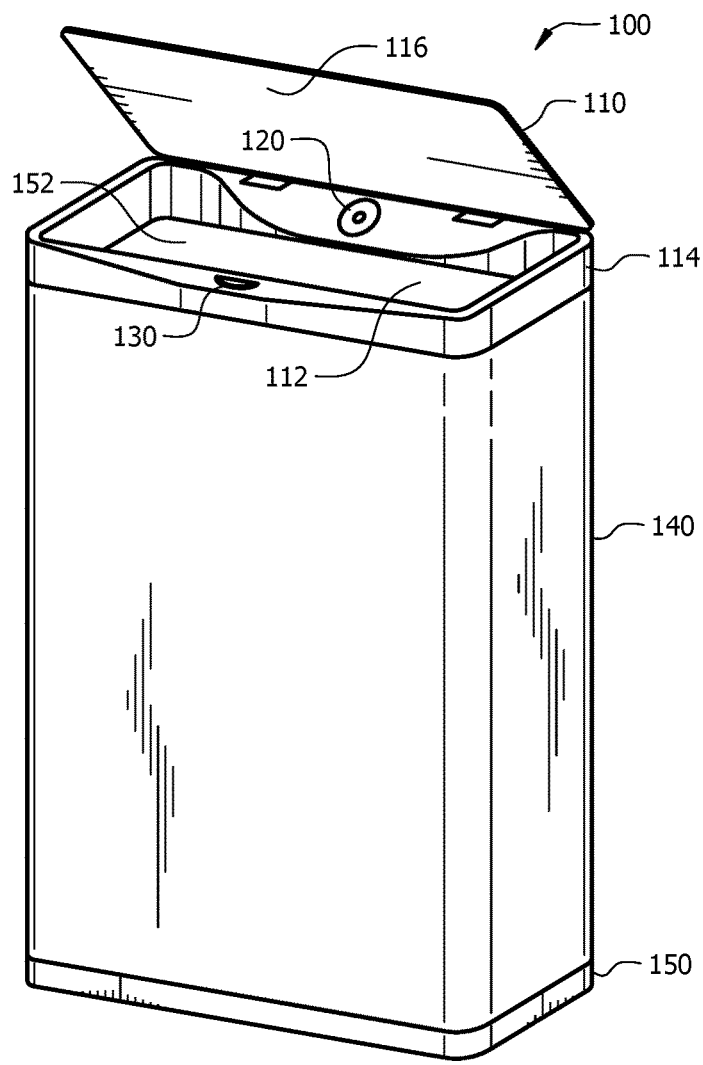
FIG. 1A is a perspective view of a touchless receptacle according to an embodiment of the present disclosure.
Figure 4:
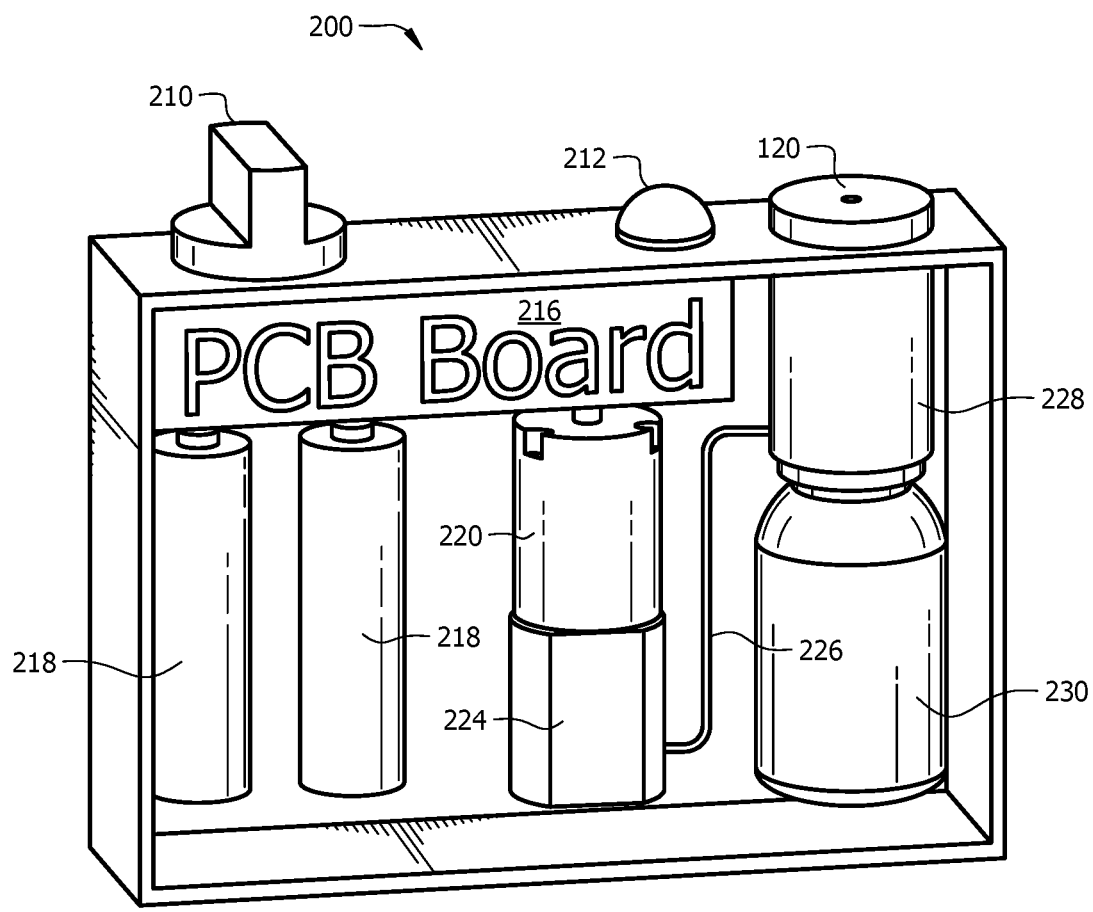
FIG. 4 is a perspective view of a fragrancing system according to an embodiment of the present disclosure.
Figure 5:
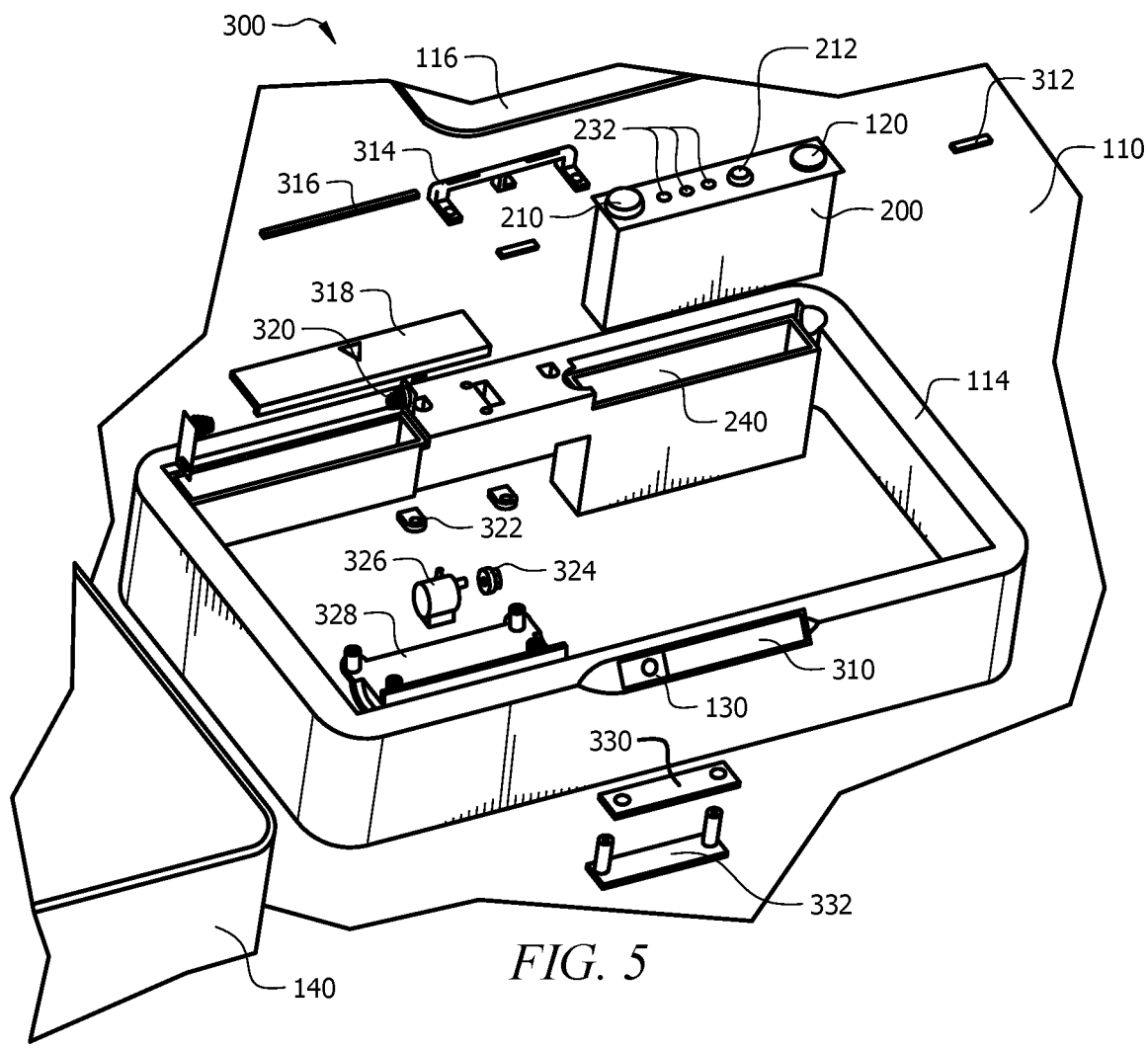
FIG. 5 is a perspective view of a lid according to an embodiment of the present disclosure.

FIG. 1A depicts touchless receptacle 100 according to an embodiment of the present disclosure. Touchless receptacle 100 may receive items including, but not limited to, waste, discarded materials, and other items through opening 112. Touchless receptacle 100 may include lid 110 that may be opened by activating motion sensor 130. Lid 110 may provide rim or lip 114 and top portion 116. Rim 114 may house activating motion sensor 130 and/or nozzle 120 that may be connected to active fragrancing system 200 (FIGS. 4 and 5).

It should be appreciated that lid 110 may be configured to completely separate or detach from touchless receptacle 100. Touchless receptacle 100 may provide non-slip molded base 150 and molded interior liner 152. It should be appreciated that non-slip molded base 150 may be in the form of a base or foot that may provide a platform for touchless receptacle 100. It should also be appreciated that touchless receptacle may be permanently fixed to non-slip molded base 150 without departing from the present disclosure. It should be appreciated that touchless receptacle 100 may provide exterior 140 that may be made of stainless steel or other similar types of materials without departing from the present disclosure. It should also be appreciated that touchless receptacle 100 may provide a height that may be approximately 26 inches and a width that may be approximately 18 inches. It should further be appreciated that approximately 10.5 inches may be a distance from a front of touchless receptacle 100 to a rear of touchless receptacle 100. It should be appreciated that a capacity of touchless receptacle 100 may be approximately 13 gallons without departing from the present disclosure.

Figure 1B:
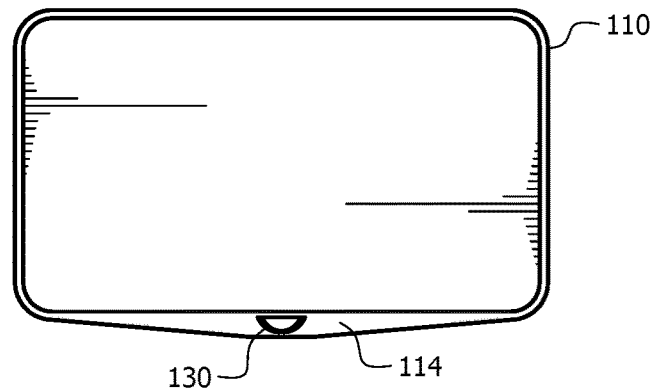
FIG. 1B is a top view of a touchless receptacle according to an embodiment of the present disclosure.

FIG. 1B depicts touchless receptacle 100 in a closed position according to an embodiment of the present disclosure. Motion sensor 130 may be activated when touchless receptacle 100 is in the closed position, and lid 110 may open for a predetermined period of time in embodiments of the present disclosure or until a user closes it in other embodiments of the present disclosure. Motion sensor 130 may be activated when a user is within a certain distance from motion sensor 130 and/or touchless receptacle 100. Motion sensor 130 may be activated at a distance of approximately 0.328 ft/0.1 m to approximately 1.5 ft/0.45 m in an embodiment of the present disclosure. It should be appreciated that the sensor may be radar or infrared in embodiments of the present disclosure and may have a range angle of approximately 120 degrees.

Figure 1C:
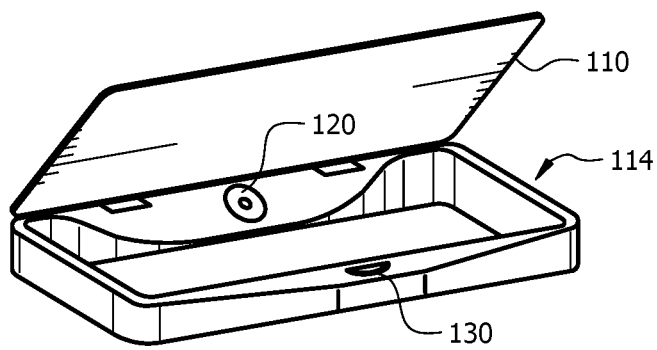
FIG. 1C is a perspective view of a lid according to an embodiment of the present disclosure.

FIG. 1C depicts lid 110 in an open position according to an embodiment of the present disclosure. Nozzle 120 may be activated in the open position, and top portion 114 of lid 110 may automatically lower and close after a predetermined period of time in embodiments of the present disclosure or until the user closes it in other embodiments of the present disclosure. It should be appreciated that motion sensor 130 may detect a signal that may prompt top portion 114 of lid 110 to close. It should also be appreciated that top portion 114 of lid 110 may close manually or upon command without departing from the present disclosure.

Figure 1D:
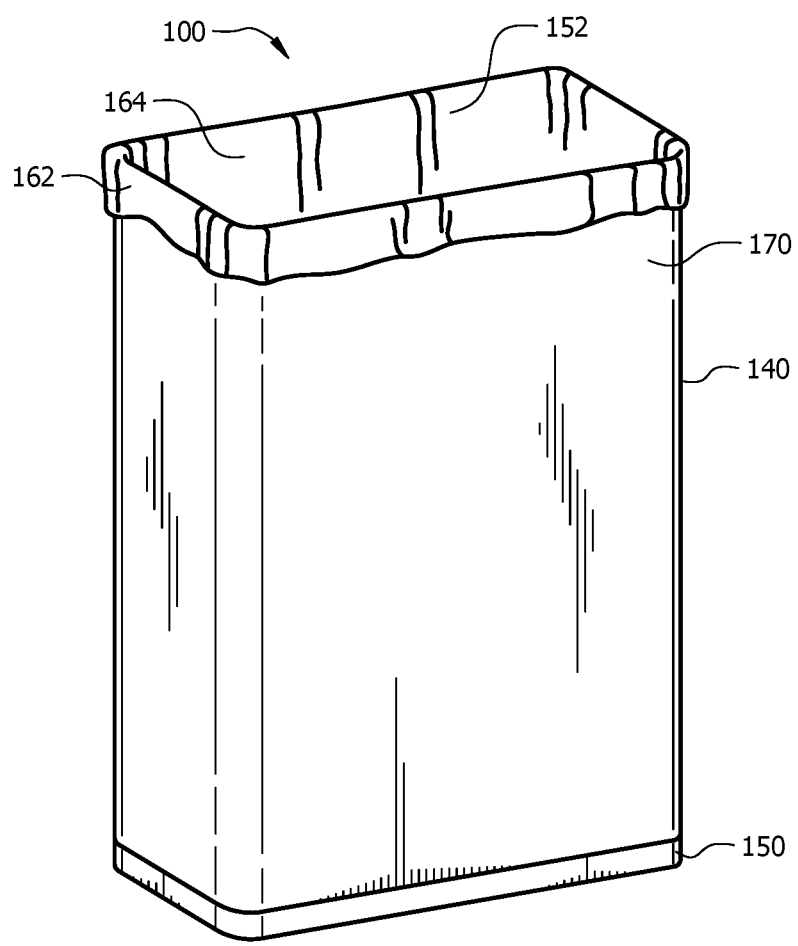
FIG. 1D is a perspective view of a touchless receptacle according to an embodiment of the present disclosure.

FIG. 1D depicts touchless receptacle 100 according to an embodiment of the present disclosure. Touchless receptacle 100 may provide lip 162 that may receive and secure liner 164 inside of touchless receptacle 100. Touchless receptacle 100 may provide non-slip molded base 150 and molded interior liner 152. It should be appreciated that non-slip molded base 150 may be in the form of a base or a foot that may provide a platform for touchless receptacle 100. It should also be appreciated that touchless receptacle may be permanently fixed to non-slip molded base 150 without departing from the present disclosure.

It should be appreciated that touchless receptacle 100 may provide exterior 140 that may be made of stainless steel without departing from the present disclosure. It should be appreciated that touchless receptacle 100 may provide a height that may be approximately 26 inches and a width that may be approximately 18 inches. It should further be appreciated that approximately 10.5 inches may be a distance from a front of touchless receptacle 100 to a rear of touchless receptacle 100 in an embodiment of the present disclosure. It should be appreciated that a capacity of touchless receptacle 100 may be approximately 13 gallons without departing from the present disclosure. Door 170 may be a swing door that may open from a front of touchless receptacle 100. It should be appreciated that door 170 of touchless receptacle 100 may provide for ease of opening, closing, and accessing the opening or molded interior lining 152 of touchless receptacle 100.

Figure 2:
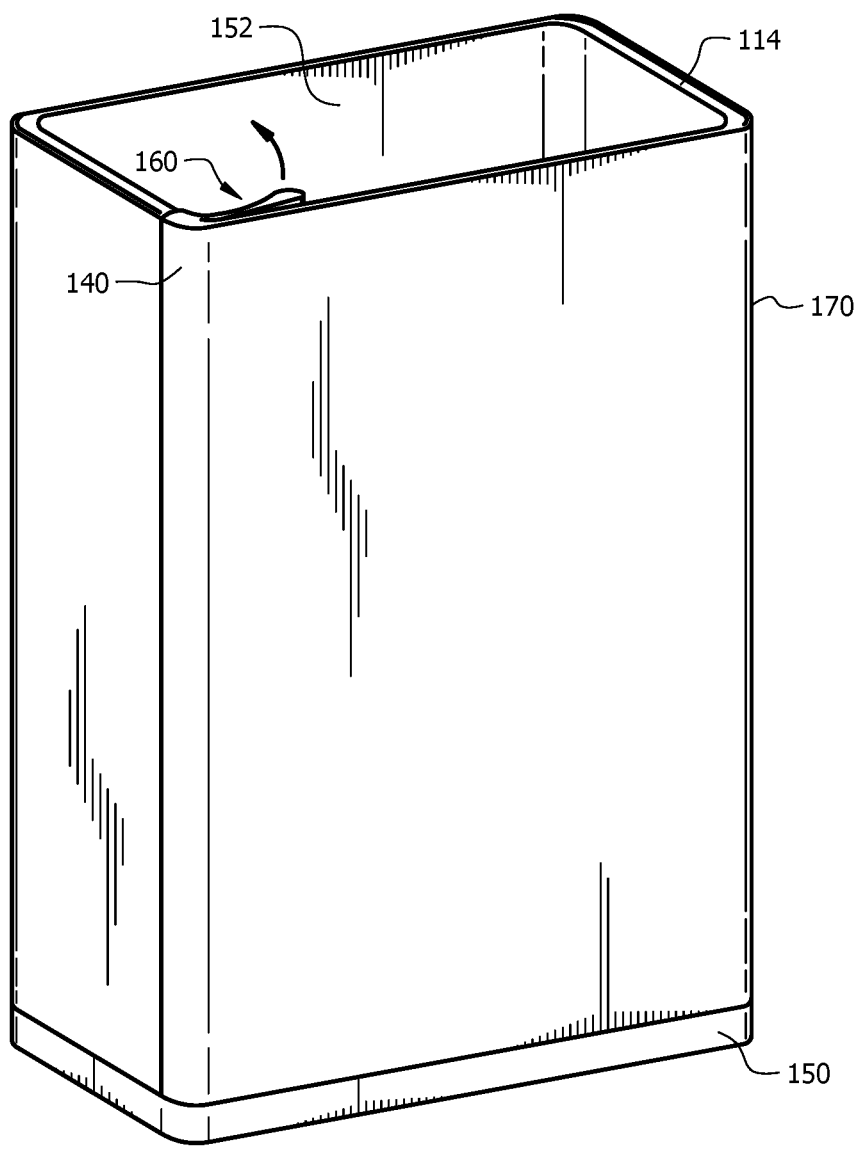
FIG. 2 is a perspective view of another touchless receptacle according to an embodiment of the present disclosure.

FIG. 2 depicts touchless receptacle 100 including door 170 according to an embodiment of the present disclosure. Door 170 may provide handle 160 that may open and close touchless receptacle 100 from a front portion or side of touchless receptacle 100. It should be appreciated that door 170 of touchless receptacle 100 may provide for ease of opening, closing, and accessing the interior of touchless receptacle 100. Door 170 may be configured to easily remove a trash bag or liner from touchless receptacle 100. For example, a user may remove lid 110, loosen and/or tie a trash bag or liner against molded interior lining 152 of touchless receptacle 100, and remove the trash bag or liner from a front of touchless receptacle 100. Non-slip molded base 150 may be in the form of a base or a foot that may provide a platform for touchless receptacle 100. It should be appreciated that touchless receptacle 100 may be permanently fixed to non-slip molded base 150 without departing from the present disclosure. It should also be appreciated that touchless receptacle 100 may provide exterior 140 that may be made of stainless steel or other similar types of materials without departing from the present disclosure. It should further be appreciated that touchless receptacle 100 may provide a height that may be approximately 26 inches and a width that may be approximately 18 inches. A distance from a front of touchless receptacle 100 to a rear of touchless receptacle 100 may be approximately 10.5 inches in an embodiment of the present disclosure.

Figure 3:
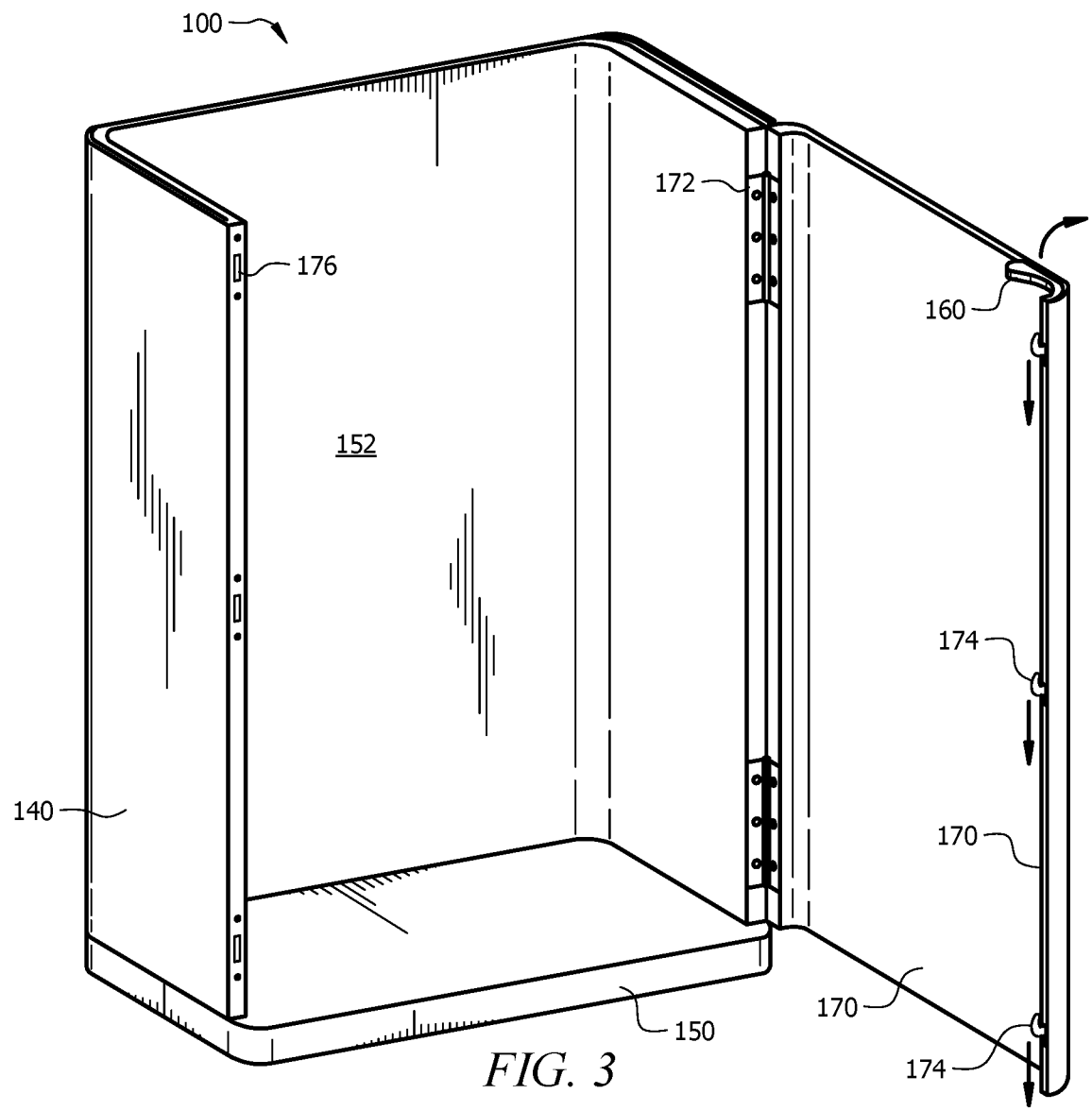
FIG. 3 is a perspective view of a touchless receptacle including a door according to an embodiment of the present disclosure.

FIG. 3 depicts touchless receptacle 100 including door 170 according to an embodiment of the present disclosure. Door 170 may provide handle 160 that may open and close touchless receptacle 100 against a front portion or side of touchless receptacle 100. It should be appreciated that door 170 may provide for ease of opening, closing, and accessing the interior or molded interior lining 152 of touchless receptacle 100. Touchless receptacle 100 may provide fasteners or hinges 172 that may be integrated vertically or along a height of touchless receptacle 100. The arrangement of fasteners or hinges 172 may provide approximately a 90-degree opening arc of door 170 in an embodiment of the present disclosure.

A side of touchless receptacle 100 opposite fasteners or hinges 172 may provide a manually-operated latch system that may include one or more apertures 176. A long or longitudinal edge of door 170 may provide one or more hooks 174 that may connect with one or more aperture 176. It should be appreciated that one or more hooks 174 and one or more aperture 176 may form a latch system. It should also be appreciated that the latch system may provide any female connector that may be one or more apertures 176 and any male connector that may be one or more hooks 174 in an embodiment of the present disclosure. Securing one or more hooks 174 into one or more apertures 176 may lock door 170 in a closed position. Securing one or more hooks 174 into one or more apertures 176 may prevent pressure that may be exerted by contents in an interior of touchless receptacle 100 from opening door 170. One or more hooks 174 may be secured in one or more apertures 176 and may be accessed by removing lid 110 (FIGS. 1A-1C and FIG. 5) from touchless receptacle 100.

If liner 164 (FIG. 2) or any other type of protective material is installed, liner 164 may be removed or unsecured from an interior or molded interior lining 152 of touchless receptacle 100 to access the latch system. It should be appreciated that one or more hooks 174 and one or more apertures 176 may be manually operated and/or electronically operated without departing from the present disclosure. It should be appreciated that one more hooks 174 and one or more apertures 176 may provide exterior 140 that may be free of protrusions or entirely smooth and. Exterior 140 may be aesthetically desirable to users by providing a surface that is free of protrusions.

Touchless receptacle 100 may provide non-slip molded base 150 and molded interior liner 152. It should be appreciated that non-slip molded base 150 may be in the form of a base or a foot that may provide a platform for touchless receptacle 100. It should also be appreciated that touchless receptacle 100 may be permanently fixed to non-slip molded base 150 without departing from the present disclosure. It should be appreciated that touchless receptacle 100 may provide exterior 140 that may be made of stainless steel or other similar types of materials without departing from the present disclosure. It should be appreciated that touchless receptacle 100 may provide a height that may be approximately 26 inches and a width that may be approximately 18 inches. A distance from a front of touchless receptacle 100 to a rear of touchless receptacle 100 may be approximately 10.5 inches.

FIG. 3 depicts a latch system including one or more hooks 174 and one or more apertures 176 (FIG. 3A) according to an embodiment of the present disclosure. Door 170 may automatically secure one or more hooks 174 inside of one or more apertures 176 when pressure is applied against a front side of door 170 toward aperture 176. A long or longitudinal edge of door 170 may provide one or more hooks 174 that may connect with one or more aperture 176. It should also be appreciated that the latch system may provide any female connector that may be one or more apertures 176 and any male connector that may be one or more hooks 174. Securing one or more hooks 174 into one or more apertures 176 may prevent pressure that may be exerted by contents in an interior of touchless receptacle 100 from opening door 170.

FIG. 4 depicts active fragrancing system 200 according to an embodiment of the present disclosure. Active fragrancing system 200 may provide intensity dial 210, push button 212, and nozzle 120 that may be accessible inside of pocket 240 (FIG. 5). Active fragrancing system 200 also may include atomizing pump module 228 and fragrance oil container 230 in embodiments of the present disclosure. Atomizing pump module 228 may emit an ultrafine fragrance mist that may be waterless through nozzle 120. It should be appreciated that atomizing pump module 228 may provide the ultrafine fragrance mist at predetermined time intervals in embodiments of the present disclosure. It should also be appreciated that atomizing pump module 228 may provide the ultrafine fragrance mist when top portion 114 of lid 110 (FIGS. 1A-1C and FIG. 5) opens without departing from the present disclosure.

It should further be appreciated that a strength, concentration, intensity, duration, and/or an amount of the ultrafine fragrance mist may be adjustable. Intensity dial 210 may be utilized to control the strength, concentration, intensity, duration, and/or the amount of the ultrafine fragrance mist. It should be appreciated that different scents may be provided and may be replaceable in touchless receptacle 100. Push button 212 may be depressed when top portion 114 of lid 110 closes. Push button 212 may be released when top portion 114 of lid 110 opens. When push button 212 is released, a spray of the ultrafine fragrance mist may be released from nozzle 120.

Active fragrancing system 200 may be battery-operated and may provide motor 220 that may be powered electronically by batteries 218. It should be appreciated that batteries 218 may be rechargeable batteries without departing from the present disclosure. It should further be appreciated that batteries 218 may have a life of approximately three months. Electric control board or PCB 216 may be connected to batteries 218 and motor 220. Motor 220 may be connected to compressor 224. Tube 226 may connect compressor 224 to atomizing pump module 228. Compressor 224 may generate bursts of compressed air that may be delivered to atomizing pump module 228. When bursts of compressed air are delivered to atomizing pump module 228, a portion of oil provided in fragrance oil container 230 may be drawn into atomizing pump module 228. Atomizing pump module 228 may volatize oil into an ultrafine mist and may dispense the ultrafine mist into the air through nozzle 120. It should be appreciated that nozzle 120 may be located or secured above atomizing pump module 228. It should be appreciated that active fragrancing system 200 may provide dimensions that may be approximately 150 millimeters (mm) long by 30 mm deep by 120 mm tall in embodiments of the present disclosure.

FIG. 5 depicts lid 300 including a plurality of electronics and hardware according to an embodiment of the present disclosure. Lid 300 may provide pocket 240 that may receive active fragrancing system 200. Active fragrancing system 200 may provide intensity dial 210, a plurality of buttons 232, push button 212, and nozzle 120. Intensity dial 210 may be integrated in a top portion of active fragrancing system 200, and intensity dial 210 may be utilized to control aspects of a fragrance mist including, but not limited to, the strength, concentration, intensity, duration, and/or the amount of the fragrance mist. A plurality of buttons 232 may be integrated into the top portion of active fragrancing system 200 and may also control aspects of a fragrance mist including, but not limited to, the strength, concentration, intensity, duration, and/or the amount of the fragrance mist. Push button 212 may be depressed when top portion 114 of lid 110 closes. Push button 212 may be released when top portion 114 of lid 110 opens. When push button 212 is released, a spray of the ultrafine fragrance mist may be released from nozzle 120.

Active fragrancing system 200 may be battery-operated and may provide motor 220 that may be powered electronically by batteries 218. It should be appreciated that batteries 218 may be rechargeable batteries without departing from the present disclosure. It should further be appreciated that batteries 218 may have a life of approximately three months. Electric control board or PCB 216 may be connected to batteries 218 and motor 220. Motor 220 may be connected to compressor 224. Tube 226 may connect compressor 224 to atomizing pump module 228. Compressor 224 may generate bursts of compressed air that may be delivered to atomizing pump module 228. When bursts of compressed air are delivered to atomizing pump module 228, a portion of oil provided in fragrance oil container 230 may be drawn into atomizing pump module 228. Atomizing pump module 228 may volatize oil into an ultrafine mist and may dispense the ultrafine mist into the air through nozzle 120. It should be appreciated that nozzle 120 may be located or secured above atomizing pump module 228.

It should be appreciated that active fragrancing system 200 may provide dimensions that may be approximately 150 millimeters (mm) long by 30 mm deep by 120 mm tall. One or more rubber components 312 may be provided on both sides of rim 114. One or more rubber components 312 may protect top portion 116 of lid 110 from being damaged and/or inadvertently making contact with active fragrancing system 200. Rim 114 may provide motion sensor 130, lens 310, sensor PCB 330, and sensor cover 332. Fastener or hinge 314 may include steel hinge 316 and may attach top portion 116 of lid 110 to rim 114. Battery door 318 may cover batteries (not shown) that may be in contact with metal components 320. Rim 114 may provide axial holder 322, driver gear 324, stepping motor 326, and motor cover 328 that may be utilized to operate touchless receptacle 100 (FIGS. 1A, 1D, 2, and 3A) including opening and closing top portion 116 of lid 110.

It should be appreciated that touchless receptacle 100 may provide a waterless mist of a fragrance oil or another liquid that may not leave a residue on surfaces. It should also be appreciated that touchless receptacle 100 may not contain harmful chemicals and/or propellants. It should further be appreciated that touchless receptacle 100 may be safe for use near children and pets. It should be appreciated that touchless receptacle 100 may not create a slipping hazard and may not damage finishes and/or surfaces. It should be appreciated that touchless receptacle 100 may atomize and/or volatize a plurality of fragrance oils and other liquids. It should also be appreciated that touchless receptacle 100 may not require fragrance oils with any particular formulation.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A receptacle system comprising:
    a receptacle having a receiving area defining a molded interior liner;
    a front-opening door defining a front side of the receptacle, the front-opening door operable to open and close the front side of the receptacle;
    a lid having a top portion and a rim, the top portion provided to open and close the lid an opening of the rim and the rim shaped to securely rest along a top perimeter of the receptacle; and
    a fragrancing system in a pocket of the rim, the fragrancing system comprising:
        a compressor operable to emit bursts of air;
        an atomizing pump module;
        a container containing a liquid; and
        a nozzle arranged above the atomizing pump module; and
    wherein the compressor is operable to deliver bursts of compressed air via a tube to the atomizing pump module which draws the liquid from the container into the atomizing pump module, the fragrancing system operable to emit a mist from the nozzle.

2. The receptacle system of claim 1, further comprising:
    a non-slip molded base configured to provide a platform for the receptacle.

3. The receptacle system of claim 1, further comprising:
    an exterior made of stainless steel, the exterior operable to resist bacteria.

4. The receptacle system of claim 1, further comprising:
    a battery-operated system in the lid including a motor, the motor powered by one or more rechargeable batteries to open and close the top portion of the lid.

5. The receptacle system of claim 1 wherein the fragrancing system includes an electronic control board connected to one or more rechargeable batteries.

6. The receptacle system of claim 1 wherein the top portion of the lid is operable to automatically open when a motion sensor is activated, the motion sensor embedded in the rim.

7. The system of claim 1, wherein the liquid of the fragancing system is waterless.

8. A touchless receptacle system comprising:
    a receptacle having a receiving area defining a molded interior liner;
    a front-opening door defining a front side of the receptacle, the front-opening door operable to open and close the front side of the receptacle;
    a lid having a top portion and a rim, the top portion provided to open and close an opening of the rim shaped to securely rest along a top perimeter of the receptacle;
    a motion sensor embedded in the rim, the motion sensor operable to open the lid when activated;
    a fragrancing system provided in a pocket of the rim, the fragrancing system comprising:
        an electronic control board connected to one or more rechargeable batteries;
        a compressor operable to emit bursts of air; and
        a motor connected to the electronic control board and the compressor, wherein the motor is arranged above the compressor and is powered by the one or more rechargeable batteries to open and close the top portion of the lid and power the compressor to dispense a waterless mist from the fragrancing system.

9. The touchless receptacle system of claim 8, further comprising:
    a non-slip molded base configured to provide a platform for the receptacle.

10. The touchless receptacle system of claim 8, further comprising:
    wherein the compressor in the fragrancing system is operable to generate compressed air that is delivered to an atomizing pump module to emit contents of a container arranged underneath the atomizing pump module in the form of the waterless mist from a nozzle.

* * * * *